US008942264B2

(12) United States Patent
Keegan

(10) Patent No.: US 8,942,264 B2
(45) Date of Patent: Jan. 27, 2015

(54) RECEIVER AND METHOD FOR RECEIVING A COMPOSITE SIGNAL

(71) Applicant: Deere & Company, Moline, IL (US)

(72) Inventor: Richard G. Keegan, Palos Verdes Estates, CA (US)

(73) Assignee: Deere & Company, Moline, IL (US)

( * ) Notice: Subject to any disclaimer, the term of this patent is extended or adjusted under 35 U.S.C. 154(b) by 121 days.

(21) Appl. No.: 13/718,837

(22) Filed: Dec. 18, 2012

(65) Prior Publication Data

US 2014/0119360 A1    May 1, 2014

Related U.S. Application Data

(60) Provisional application No. 61/719,005, filed on Oct. 26, 2012.

(51) Int. Cl.
*H04J 99/00* (2009.01)
*H04L 5/22* (2006.01)

(52) U.S. Cl.
CPC .......................................... *H04L 5/22* (2013.01)
USPC .......................................... 370/546; 370/313

(58) Field of Classification Search
CPC ........................... H04J 11/0079; H04J 11/0086
USPC ................... 370/204, 205, 313, 546
See application file for complete search history.

(56) References Cited

U.S. PATENT DOCUMENTS 3,922,496 A    11/1975    Gabbard et al.
4,914,735 A    4/1990    Ichiyoshi 5,729,570 A     3/1998    Magill
6,097,762 A     8/2000    Suzuki et al.
6,359,504 B1    3/2002    Cozzarelli
6,922,167 B2 *  7/2005    Gerein ..................... 342/357.74
7,043,271 B1    5/2006    Seto et al.
7,120,198 B1    10/2006   Dafesh et al.
(Continued)

FOREIGN PATENT DOCUMENTS

EP    1672384 A2    6/2006
EP    1664827 B1    8/2007
(Continued)

OTHER PUBLICATIONS

Lohan, Elena Simona; Renfors, Markku; Correlation properties of Multiplexed Binary Offset Carrier (MBOC) modulation, Institute of Communications Engineering, Tampere University of Technology, FIN-33101, Finland.
(Continued)

*Primary Examiner* — Ricky Ngo
*Assistant Examiner* — Dewanda Samuel

(57) ABSTRACT

A multiplexer is capable of multiplexing at least two signals selected from the first signal, the second signal and the null code signal. In a first mode, the multiplexer multiplexes the first signal and the null code signal consistent with a predetermined time sequence for expression of the null code in first precursor signal In a second mode, the multiplexer multiplexes the first signal and the second signal to provide a second precursor signal. A correlator can correlate the digital received composite signal to the locally generated reference signal to decode at least a first portion of the received composite signal or the entire received composite signal, depending upon the mode (e.g., operation in the first or second mode).

34 Claims, 4 Drawing Sheets

(56) References Cited

U.S. PATENT DOCUMENTS

| | | | |
|---|---|---|---|
| 7,164,696 B2 | 1/2007 | Sano et al. | |
| 7,346,918 B2 | 3/2008 | Hennenhoefer et al. | |
| 7,418,043 B2 | 8/2008 | Shattil | |
| 7,471,247 B2* | 12/2008 | Saily et al. | 343/700 MS |
| 7,949,038 B2* | 5/2011 | Avellone et al. | 375/150 |
| 8,111,735 B2* | 2/2012 | Chen | 375/150 |
| 8,233,518 B2 | 7/2012 | Pratt et al. | |
| 8,509,286 B2* | 8/2013 | Hodgart | 375/147 |
| 2004/0165652 A1 | 8/2004 | Schilling et al. | |
| 2005/0281325 A1* | 12/2005 | Lillo et al. | 375/150 |
| 2007/0176676 A1 | 8/2007 | Pratt et al. | |
| 2007/0195867 A1* | 8/2007 | Betz et al. | 375/152 |
| 2007/0274374 A1* | 11/2007 | Abraham | 375/148 |
| 2008/0260001 A1 | 10/2008 | Betz et al. | |
| 2009/0046766 A1* | 2/2009 | Avellone et al. | 375/142 |
| 2010/0284440 A1 | 11/2010 | Betz et al. | |
| 2011/0261805 A1* | 10/2011 | Landry et al. | 370/342 |

FOREIGN PATENT DOCUMENTS

| | | |
|---|---|---|
| EP | 1830199 B1 | 2/2012 |
| GB | 2456867 B | 10/2011 |
| JP | 008130563 A | 5/1996 |
| JP | 2007504731 A | 10/2007 |
| JP | 2008032737 A | 2/2008 |
| WO | 2005011131 A2 | 2/2005 |

OTHER PUBLICATIONS

Slimane, S. Ben; Le-Ngoc, T.; Bandwidth Efficient Differential Phase Shift Keying (PSK) Techniques for TDMA Applications. Concordia University Electrical and Computer Engineering Department. Montreal, Quebec, Canada.

Dovis, Fabio; Presti, Letizia Lo; Fantino, Maurizio; Mulassano, Paolo; Godet, Jeremie; Comparison between Galileo CBOC Candidates and BOC (1,1) in Terms of Detection Performance, International Journal of Navigation and Observation, vol. 2008, Article ID 793868.

Pratt, Anthony R.; Owen, John I.R.; Hein Guenter W.; Avila-Rodriguez, Jose A., Tracking Complex Modulation Waveforms—How to Avoid Receiver Bias. Ively Road, Farnborough, GU 14 OLA, United Kingdom. University FAF Munich, Werner-Heisenberg-Weg 39; Neubiberg, 85577, Germany.

Pratt, Anthony R.; Owen, John I.R.; Hein Guenter W.; Avila-Rodriguez, Jose A.; Controlling the Galileo L1 OS Signal Emissions with satellite Baseband Filters. Ively Road, Farnborough, GU 14 OLA, United Kingdom.

Hein, Guenter W.; Avila-Rodriguez, Jose-Angel; Wallner, Stefan; Pratt, Anthony R.; Owen, John; Issler, Jean-Luc; Betz, John W.; Hegarty, Chris J.; Lenahan, Lt Sean: Rushanen Joseph J.; Kraay, Andrea L.; Stansell, Thomas A.; MBOC: The New Optimized Spreading Modulation Recommended for GALILEO L1 OS and GPS L1C. 2006.

Soellner, M.; Erhard, PH.; Comparison of AWGN Code Tracking Accuracy for Alternative-BOC, Complex-LOC and Complex-BOC Modulation Options in Galileo E5-Band. System-Engineer Navigation, Astnum Germany, Ottobrunn, European Space Agency.

Stansell, Tom; Fenton, Pat; Garin, Lionel; Hatch, Ron; Knight, Jerry; Rowitch, Doug; Sheynblat, Len; Stratton, Alex; Studenny, John; Weill, Larry; BOC or MBOC? The Common GPS/Galileo Civil Signal Design: A Manufacturers Dialog, Part 1, 2005. InsideGNSS. Jul./Aug. 2006.

Global Positioning System Directorate Systems Engineering & Integration Interface Specification IS-GSP-800, Navstar GPS Space Segment/User Segment L1C Interface, publication IS-GPS-800, dated Sep. 21, 2011, available online at http://www.gps.gov/technical/icwg/#is-gps-800.

* cited by examiner

RECEIVER AND METHOD FOR RECEIVING A COMPOSITE SIGNAL

This document (including the drawings) claims priority and the benefit of the filing date based on U.S. provisional application No. 61/719,005, filed Oct. 26, 2012 under 35 U.S.C. §119 (e), where the provisional application is hereby incorporated by reference herein.

FIELD OF THE DISCLOSURE

This disclosure relates to a receiver and method for receiving a composite signal.

BACKGROUND

A transmitter of a navigation satellite might transmit a composite signal, such as a multiplexed binary offset carrier signal. In certain prior art, a complex receiver may be required to decode fully the multiplexed binary offset carrier signal. For example, the receiver may need knowledge of: (1) the carrier frequency or suppressed carrier frequency of each binary offset carrier component, and (2) the modulation scheme to form a local replica of the multiplexed binary offset carrier signal at the receiver. However, the end user of the receiver may or may not be authorized to use the local replica of the complete composite signal under a license, agreement or subscription associated with a service plan, or consistent with a certain level of service. Further, the end under of the receiver may be or may not be authorized to use the local replica of the complete composite signal in certain geographic areas, for example. Thus, there is a need for a receiver that can fully or partially decode the composite signal or the multiplexed binary offset signal.

SUMMARY

In accordance with one embodiment, a receiver for receiving a binary offset carrier signal is capable of at least partially decoding a received composite signal. A receiver front-end is configured for down-converting a received composite signal. An analog-to-digital converter is capable of converting the down-converted composite signal to a digital received composite signal. A first signal generator is arranged to generate a first signal. A second signal generator is arranged to generate a second signal. A data storage device is configured to provide a null code or null code signal. A multiplexer is capable of multiplexing at least two signals selected from the first signal, the second signal, and the null code signal. In a first mode, the multiplexer multiplexes the first signal and the null code signal consistent with a predetermined time sequence for expression of the null code in first precursor signal (e.g., weakly correlated precursor signal or partial precursor signal) to the locally generated reference signal. In a second mode, the multiplexer multiplexes the first signal and the second signal to provide a second precursor signal (e.g., strongly correlated precursor signal or complete precursor signal) to the locally generated reference signal. A ranging code generator is arranged for generating a ranging code. A mixer accepts the ranging code and the precursor signal (e.g., the first precursor signal or the second precursor signal) and outputs a locally generated reference signal. A correlator can correlate the digital received composite signal to the locally generated reference signal to decode at least a first portion of the received composite signal or the entire received composite single, depending upon whether the correlator is operating in accordance with the first mode or the second mode. A tracking loop signal processor process the locally generated reference signal with respect to the digital received composite signal to maximize correlation of the received composite signal to the locally generated reference signal.

DESCRIPTION OF EMBODIMENT(S)

Figure 1:
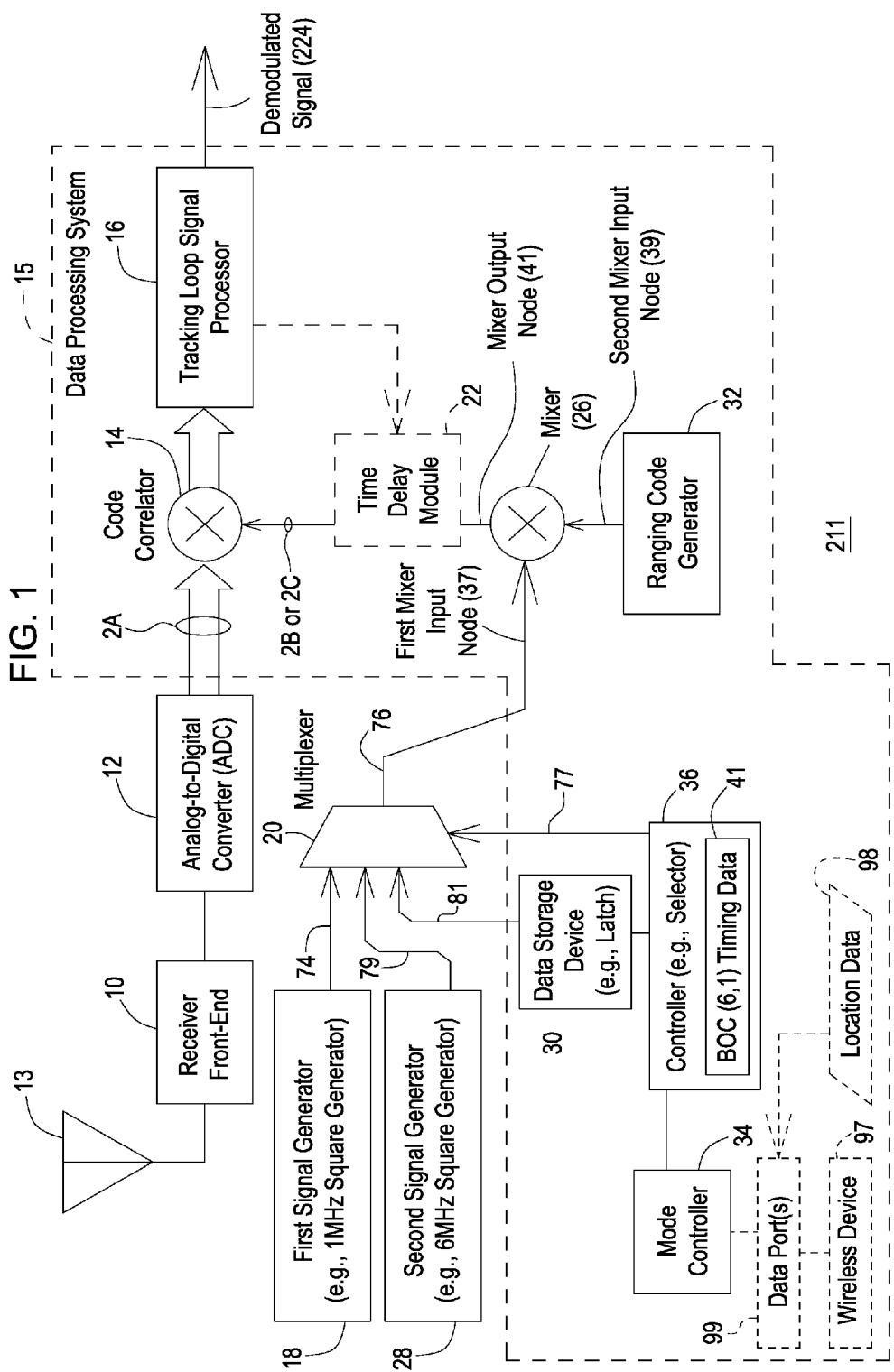
FIG. 1 is a block diagram of one embodiment of a receiver for receiving a composite signal (e.g., multiplexed binary offset carrier signal).

In accordance with one embodiment, FIG. 1 shows a receiver 211 for receiving a composite signal (e.g., multiplexed binary offset carrier signal or a pilot component of the L1C signal for GPS), where the receiver is capable of at least partially decoding a received composite signal that is received at antenna 13. In one embodiment, the received composite signal is transmitted from a satellite, such as a navigation satellite, or such as a Galileo-compatible navigation satellite or Global Positioning System satellite. In one embodiment, the received composite signal refers to a first binary offset carrier signal that is multiplexed with a second binary offset carrier signal, where the first binary offset carrier signal comprises a first modulating subcarrier signal ($f_m$) (e.g., a square wave, sine wave, or cosine wave) multiplied by a secondary modulating signal or a ranging code signal ($f_n$) (e.g. pseudo-random noise ranging signal or pseudo-noise signal) that is equal to or greater than a chip rate of spread spectrum signal. Similarly, the second binary offset carrier signal comprises a second modulating subcarrier signal ($f_o$) (e.g., a square wave, sine wave, or cosine wave) multiplied by the secondary modulating signal or the ranging code signal ($f_p$) (e.g., where $f_n$ is set equal to $f_p$).

As used in this document, a binary offset carrier (BOC) signal may comprise a sine BOC signal (sin BOC), a cosine BOC signal (cos BOC), multiplexed binary offset carrier (MBOC), a time-division multiplexed BOC signal, an alternative BOC signal, a double BOC signal, a composite binary offset carrier signal, an L1C signal of a GPS system, or other variants. Certain BOC signals (e.g., BOC or sin BOC) can be represented as BOC (m,n) where m is $f_m/f_c$ and n is $f_n/f_c$, $f_m$ is a first subcarrier frequency, $f_n$ is the actual chip frequency, and $f_c$ is the reference chip frequency. Similarly, BOC signals (e.g., BOC or sin BOC) can be represented as BOC (o,p) where o is $f_o/f_c$ and p is $f_p/f_c$, $f_o$ is a first subcarrier frequency, $f_p$ is the actual chip frequency, and $f_c$ is the reference chip frequency. In one example, $f_c$ may be set to 1.023 Megahertz (MHZ) or the reference course acquisition code (C/A code) reference signal of the GPS system.

The power spectral density of an illustrative square-wave modulated MBOC signal may be represented by the following equation:

$$G_{MBOC}\left(o, p, \frac{z}{y}\right)(f) = \frac{x}{y}G_{BOC(m,n)}(f) + \frac{z}{y}G_{BOC(o,p)}(f),$$

where
x is an integer greater than z, y is an integer and common denominator, the indices m, n, o and p are defined above, In one example, x/y approximately equals 10/11 and z/y approximately equals 1/11, such that a majority of the power spectral density is associated with the lower frequency $G_{BOC(m,n)}$ component, rather than the higher frequency $G_{BOC(o,p)}$ component.

The power spectral density of an illustrative square-wave modulated (6,1,z/y) MBOC signal may be represented by the following equation:

$$G_{MBOC}\left(6, 1, \frac{z}{y}\right)(f) = \frac{x}{y}G_{BOC(1,1)}(f) + \frac{z}{y}G_{BOC(6,1)}(f),$$

where
x is an integer greater than z, y is an integer and common denominator, the indices m, n, o and p are defined above, In one example, x/y approximately equals 10/11 and z/y approximately equals 1/11, such that a majority of the power spectral density is associated with the lower frequency $G_{BOC(1,1)}$ component, rather than the higher frequency $G_{BOC(6,1)}$ component.

For a sine-wave modulated MOBC signal, the power spectral density of an illustrative MBOC signal may be represented by the following equations:

$$G_{MBOC}\left(6, 1, \frac{x}{y}\right)(f) = \frac{x}{y}G_{SinBOC(1,1)}(f) + \frac{z}{y}G_{SinBOC(6,1)}(f),$$

where $$G_{SinBOC(m,n)}(f) = \frac{1}{T_C}\left(\frac{\sin\left(\pi f \frac{T_C}{N_B}\right)\sin(\pi f T_C)}{\pi \cos\left(\pi f \frac{T_C}{N_B}\right)}\right)^2,$$

where
x is an integer greater than z, y is an integer and common denominator, the indices m, n are defined above, $N_B$ is the BOC modulation index or $N_B$ equals 2m/n, and $T_C$ is the actual chip rate (e.g., of the second subcarrier signal). In one example, x/y approximately equals 10/11 and z/y approximately equals 1/11, such that a majority of the power spectral density is associated with the lower frequency $G_{Sin\ BOC(1,1)}$ component, rather than the higher frequency $G_{Sin\ BOC(6,1)}$ component.

In one embodiment, a receiver front end 10 is coupled to an analog-to-digital converter 12. In turn, the analog-to-digital converter 12 communicates with a code correlator 14. A first signal generator 18, a second signal generator 28, and a data storage device 30 (e.g., latch) are coupled to multiplexer inputs 75 (e.g., input ports) of a multiplexer 20. A controller 36 (e.g., selector) is coupled to a control input 77 of the multiplexer 20. The controller 36 is capable of communicating with a mode controller 34 and the data storage device 30. A multiplexer output 76 (e.g., an output port) of the multiplexer 20 and a ranging code generator 32 are coupled to a mixer 26. In turn, the mixer 26 is coupled to the code correlator 14, either directly or indirectly via an optional time delay module 22. The time delay module 22 is shown in dashed lines because it is optional and may be deleted if the tracking loop signal processor 16 and the code correlator 14 are configured to obviate the need for the time delay module 22. The code correlator 14 communicates with a tracking loop signal processor 16 or tracking look signal processing system. If the time delay module 22 is used, the code correlator 14 is capable of communicating with (or controlling) the time delay module 22.

In one embodiment, one or more optional data ports 99 are coupled to or assigned to the mode controller 34. An optional wireless device 97 may be coupled to one of the data ports 99. Location data 98 that indicates the location of receiver 215 may be fed into another one of the data ports 99. The location data 98 may be derived, at least partially, from the demodulated signal 224 or otherwise from the receiver 211. Alternatively, a separate location-determining receiver (e.g., Global Positioning System (GPS) receiver may provide location data 98 to the data port 99. The data ports 99, mode controller 34, wireless device 97, and location data 98 are shown as dashed lines because each of the foregoing elements is optional. For example, the wireless device 97 may comprise a wireless transceiver or receiver that supports remote programming of the mode controller 36 or receiver 211 by a remote computer (not shown) equipped with second wireless device (not shown) capable of communication with the wireless device 97 via an electromagnetic signal. Alternately, the remote computer may be coupled to a data port 99 directly via a cable or transmission line for programming of the mode controller 36 or the receiver 211.

Each line or arrow that interconnects the elements of FIG. 1 may comprise a physical communication path, a virtual communication path, or both. A physical communication path refers to a transmission line, a conductor, or a data bus, for example. A virtual communications path comprises communications (e.g., data, electrical signals, or electromagnetic signals) between software modules, subroutines, programs or software instructions, or between electronic modules, for example.

A receiver front-end 10 is coupled to an antenna 13 for receiving a composite signal (i.e., received composite signal), a microwave signal, a radio frequency signal, or another electromagnetic signal, such as a spread-spectrum signal or a code division multiple access signal transmitted by a navigation satellite. A receiver front-end 10 is configured for down-converting the received composite signal to a baseband signal or an intermediate frequency signal. An analog-to-digital converter 12 is capable of converting the down-converted signal (e.g., analog baseband signal or analog intermediate frequency signal) to a digital composite signal.

A first signal generator 18 is arranged to generate a first signal at one multiplexer input 75 or a first input port 74. The first signal may comprise one or more of the following: a first subcarrier and a first modulating signal. In one embodiment, the first signal generator 18 comprises a square wave generator or a sinusoidal generator at first frequency. In another embodiment, the first signal generator 18 is capable of generating a first precursor signal (e.g., BOC (1,1) signal precursor or Sin BOC (1,1) signal precursor) associated with a dominant signal component of the composite signal (e.g., MBOC signal), or another predecessor for formation of a BOC signal or MBOC signal. As used in this document, the first precursor signal is used to refer to a precursor signal that is at a multiplexer input 75, a multiplexer output 76, or both;

the first precursor signal at multiplexer input 75 may be referred to as a primary precursor signal or the first premux precursor signal to distinguish it from the first precursor signal at the multiplexer output 76. In one configuration, the first signal comprises a dominant signal component (e.g., BOC(1,1) signal component) of the locally generated reference signal that is a multiplexed binary offset carrier signal.

A second signal generator 18 is arranged to generate a first signal at one multiplexer input 75 or a second input port 79. In one embodiment, the second signal generator 18 comprises a square wave generator or a sinusoidal generator at a second frequency, where the second frequency is greater than or equal to the first frequency. In another embodiment, the first signal generator 18 is capable of generating a second precursor signal (e.g., BOC(6,1) signal precursor or Sin BOC (6,1) signal precursor) associated with a non-dominant signal component of the composite signal (E.g., MBOC signal), or another predecessor for formation of a BOC signal or MBOC signal. As used in this document, the second precursor signal is used to refer to a precursor signal that is at a multiplexer input 75, a multiplexer output 76, or both; the second precursor signal at multiplexer input 75 may be referred to as a secondary precursor signal or a second premux precursor signal to distinguish it from the second precursor signal at the multiplexer output 76. In one configuration, the second signal comprises a precursor component or non-dominant component (e.g., BOC(6,1) signal component) of the locally generated reference signal that is a multiplexed binary offset carrier signal.

A data storage device 30 (e.g., latch) is configured to provide null code or null code signal to another multiplexer input 75 or a third input port 81. In one embodiment, the null code symbol is approximately 0 volts or a direct current (DC) voltage that approaches zero, chassis potential or ground potential of the receiver 211.

A multiplexer 20 is capable of multiplexing two or more of the following: (1) first signal, (2) second signal, and (3) the null code. In the first mode, the multiplexer 20 multiplexes the first signal and the null code consistent with the timing data 41 or a predetermined time sequence for expression of the null code in a first precursor signal (at the multiplexer output 76) to the locally generated reference signal. The time-division multiplexed combination of the first signal and the null code is referred to as the first combination, or the first precursor at the multiplexer output 76. The first precursor signal is a multiplexed modulating signal prior to spreading by the ranging code, where the modulating signal solely contains the available data content of a dominant signal component (e.g., BOC (1,1) signal component) and the timing data (without any available data content) of the non-dominant signal component (e.g., BOC(6,1) signal component).

In a second mode, the multiplexer 20 multiplexes the first signal and the second signal to produce a second precursor signal at the multiplexer output 76. The time-division multiplexed combination of the first signal and the second signal is referred to as the second combination, or the second precursor at the multiplexer output 76. The second precursor signal is a multiplexed modulating signal prior to spreading by the ranging code.

The mode controller 34 determines whether the receiver 211 operates in a first mode or a second mode, or both (at different times). For example, the mode controller 34 may determine whether the receiver is authorized for a geographic region to operate in the first mode, the second mode or both. Similarly or alternately, the mode controller 34 may determine whether the receiver is authorized for a certain level of service to operate in the first mode, the second mode, or both.

In one embodiment, one or more optional data ports 99 are coupled to or assigned to the mode controller 34 to allow the input or output of receiver configuration data, mode configuration data, mode authorization data, geographic authorization data for one or more corresponding modes, temporal authorization data for one or more corresponding modes, service plan authorization data for one or more corresponding modes, where the modes refer to the first mode and the second mode. In one configuration, the mode controller 34 can be programmed via a data port 99 (in communication with the mode controller 34) such that the receiver 211 operates with a desired level of service in a first mode, a second mode, or both. The data port 99 may receive, locally or via wireless device 97, transceiver or link, program instructions for configuration of the mode controller 34 and associated authorized operational modes.

In one scheme, instantaneous or ongoing location data 99 from the receiver 211 or an ancillary location-determining receiver (e.g., satellite navigation receiver) to determine whether or not to operate in the first mode, the second mode, or both dynamically based on a comparison to the latest position or location of the receiver 211 to determine whether the latest position or location is within an authorized geographic zone in accordance with a license, agreement, or level of service terms with the subscriber or end user of the receiver 211.

For the first mode, a controller 36 provides the timing data 41 or predetermined time sequence to a control port 77 of the multiplexer 20. For example, the timing data 41 or predetermined time sequence (e.g., for insertion of null codes into appropriate corresponding time slots of the first signal or in compliance with a signal standard or IS-GPS-800A standard for L1C) may be based on the BOC(6,1) signal component if the composite signal is a MBOC signal with BOC(1,1) and BOC(6,1) components. The multiplexer 20 outputs the precursor signal (e.g., first precursor signal) at the multiplexer output 76, which is coupled to the first mixer input node 37 as shown in FIG. 1. A ranging code generator 32 is arranged for generating a ranging code at the second mixer input node 39. In the first mode, the first precursor signal outputted at the multiplexer output 76 comprises any available data content in the first signal and no available data content (e.g., pilot data for recovering other data content or carrier phase information) of the second signal, consistent with the timing data 41 or weighting (e.g., time-slot weighing) of the contributions of the first signal and the null code signal.

For the second mode, the controller 36 controls the multiplexing of the first signal and the second signal. For example, the controller 36 determines when to select the first signal or the second signal for expression in a time slot of the precursor signal (e.g., second precursor signal) outputted at the multiplexer output 76. For example, the controller 36 may store timing data 41 for formation of a desired MBOC precursor signal (e.g., second precursor signal) with the first signal component (e.g., dominant signal BOC component or BOC (1,1) signal component) and the second signal component (e.g., non-dominant signal component of BOC (6,1) signal component, where the first signal component is dominant because it occupies more time slots in the desired MBOC precursor signal than the second signal component. The desired MBOC precursor signal may correspond to time slots of IS-GPS-800A standard for L1C. In the second mode, the second precursor signal outputted at the multiplexer output 76 comprises any available data content (e.g., pilot data for acquiring other data content or carrier phase information) in the first signal and the second signal, consistent with the timing data 41 or weighting (e.g., time-slot weighing) of the contributions of the first signal and the second signal.

In one embodiment, a mixer 26 is capable of accepting the ranging code and the precursor signal and outputting a locally generated reference signal at a mixer output node 41, where the precursor signal comprises the first precursor signal in the first mode and the second precursor signal in the second mode. A code correlator 14 can correlate the digital received composite signal (e.g., after downconversion by receiver front end 10 and digitization by the analog-to-digital converter 12) to the locally generated reference signal to decode at least a first portion (e.g., dominant signal BOC component or BOC(1,1) signal component) of the received composite signal, for example.

In one embodiment, a correlator 14 can correlate the digital received composite signal to the locally generated reference signal to decode at least a first portion of the received composite signal in the first mode or the entire received composite single in the second mode, depending upon whether the correlator 14 is operating in accordance with the first mode or the second mode. In the first mode, a correlator 14 can correlate the digital received composite signal to the locally generated reference signal to decode at least a first portion (e.g., dominant signal BOC component or BOC(1,1) signal component) of the received composite signal, while leaving a second portion (e.g., nondominant signal BOC component or BOC (6,1) signal component) of the received composite signal undecoded. In a second mode, the correlator 14 can correlate the digital received composite signal to the locally generated reference signal to decode completely the entire received composite signal. Completely decoding the received signal means decoding both the first portion (e.g., dominant signal BOC component or BOC(1,1) signal component) and the second portion (e.g., nondominant signal BOC component or BOC(6,1) signal component) of the received composite signal.

A tracking loop signal processor 16 is arranged for processing the locally generated reference signal with respect to the digital received composite signal to maximize correlation of the received composite signal to the locally generated reference signal. For example, a tracking loop signal processor 16 can shift an adjustable time delay, or engage in other data processing of one or more digital signals associated with (e.g., or derived from) the locally generated reference signal with respect to the received digital composite signal (e.g., direct path signal transmitted by a satellite or one or more multipath signals resulting from a satellite transmission) via a time delay module 22 to maximize correlation of the received composite signal to the locally generated reference signal. The tracking loop signal processor 16 outputs a demodulated signal 224, such as a demodulated digital signal with a quadrature phase component and in-phase component at baseband.

In another configuration, the demodulated signal 224 may comprise a demodulated pilot component of an L1C carrier signal of a GPS-compliant satellite transmission. The demodulated pilot component may be a preliminary step in decoding a related data component that modulates the composite signal, for example. Alternatively, the demodulated pilot component may be a preliminary step in detecting a carrier phase or resolving a carrier phase ambiguity of the composite signal (e.g., L1C). The demodulated digital signal 224 (along with similar demodulated signals received from other satellites) may be used to estimate a position (e.g., geographic coordinates in two or three dimensions), velocity, or acceleration of the receiver, or the attitude (e.g., tilt angle, roll angle, or yaw angle (heading)) of the receiver.

In one embodiment, the receiver front end 10 may comprise one or more of the following elements: an amplifier or preamplifier coupled to the antenna 13, an amplifier or preamplifier for amplifying a received radio frequency or microwave signal that is transmitted by a navigation satellite transmitter, a local oscillator, a frequency adjustable local oscillator, an intermediate frequency amplifier, mixer, and a downconverter. For example, the downconverter may comprise the combination of a mixer and the local oscillator to multiply or mix the received composite signal at a transmitted frequency with a local oscillator at the transmitted frequency or lower frequency to downconvert the received composite signal to an analog intermediate frequency signal or an analog baseband signal.

In an alternate embodiment, the receiver front end 10 may have multiple down-converters in series or successive stages, where the first downconverter stage downconverts the received composite signal to an intermediate frequency analog signal and where the last stage downconverts the intermediate frequency analog signal to a baseband analog signal.

In one configuration, the analog-to-digital converter 12 is capable of converting the intermediate frequency analog signal or the baseband analog signal to a digital intermediate frequency signal or a digital baseband signal. The analog-to-digital converter 12 has sufficient processing throughput and adequate response times to provide real-time output of digital signals for processing by the receiver 211.

In one embodiment, a data processing system 215 comprises a combination of one or more of the following: the code correlator 14, the tracking loop signal processor 16, the time delay module 22, the data storage device 30, the controller 36, the mode controller 34, one or more data ports 99, and a wireless device 97. The data processing system 215 may comprise hardware and software instructions. For example, in one illustrative embodiment the hardware comprises a data processor that communicates to a data storage device, which stores software instructions, via one or more data buses. The data processor may comprise one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device may comprise electronic memory, volatile electronic memory, a magnetic storage device, an optical storage device, or any other device for storing data.

The first signal generator 18 may comprise an oscillator circuit or a precision oscillator circuit that is capable of generating one or more of the following: a square wave, a sinusoidal wave, a rectangular waveform, a triangular waveform, a pulse train, bipolar phase shift keying, or another first signal. For example, in one embodiment the oscillator may comprise a phase locked loop circuit. In another embodiment, the oscillator circuit is associated with a highly stable and accurate clock signal to generate a first signal at a first frequency with precision and a maximum known tolerance or deviation from the first frequency. The first signal may refer to the first subcarrier or a first modulating signal.

In one embodiment, the data storage device 30 comprises one or more of the following: a latch, a register, a flip-flop, electronic memory, or nonvolatile electronic memory. The controller 36 may control the output of the data storage device 30. For example, the controller 36 may control set, reset, write, read, or other commands of the data storage device 30, the multiplexer 20, or both. Further, the controller 36 may control operational modes or states of the data storage device 30, the multiplexer 20, or both in coordination with a clock signal or timer. In one embodiment, the controller 36 manages, stores, retrieves, or accesses timing data 41 associated with the predetermined sequence of the composite signal, where the timing data 41 or the predetermined sequence defines time slots for the insertion of non-dominant signal components (e.g., BOC (6,1)) into composite signal (e.g., MBOC) available at multiplexer output 76, where the dominant signal component (e.g., BOC (1,1) signal component) has a majority of the spectral density.

In one configuration, the multiplexer 20 comprises a time division multiplexer that has at least two multiplexer inputs 75, a multiplexer output 76 and a control input 77. The controller 36 is coupled to the control input 77. The controller 36 stores, retrieves or accesses timing data associated with a component signal (e.g., nondominant component signal, such as BOC (6,1) signal component of a MBOC signal) of the received composite signal. For each time slot of the multiplexer output signal, the controller 36 is adapted to determine the multiplexer output signal at the multiplexer output 76 from the selection of the input signals (e.g., first signal or the null code) applied to the first multiplexer input 74 or the second multiplexer input 79 consistent with the timing data 41.

The multiplexer 20 is capable of multiplexing square wave signals, sinusoidal wave signals, Manchester-encoded signals, logic level signals (e.g., transistor logic level or complementary metal-oxide semiconductor logic levels), or otherwise. The multiplexer 20 is capable of multiplexing the first signal and the null code (or null signal) of the data storage device 30 consistent with the timing data 41 or a predetermined time sequence for expression of the null code in a produced precursor signal at the multiplexer output 76.

In alternate embodiments, a frequency division multiplexer may be used to form a precursor of a local replica signal where similar frequency division multiplexing was used at a transmitter that transmits the composite signal.

In one embodiment, the ranging code generator 32 may comprise any generator for generating a spread spectrum code, spread spectrum sequence, binary sequences, Gold codes, pseudo-random noise code or a pseudo-random noise code sequence that is similar to a spread spectrum code, spread spectrum sequence, binary sequences, Gold codes, pseudo-random noise code or a pseudo-random noise code sequence transmitted by a transmitter of a satellite for reception by the receiver 211 as the composite signal. In another embodiment, the ranging code generator 32 may be formed of series of shift registers that are loaded with an initial starting code sequence, where the shift registers have various selectable or controllable taps for providing feedback and reiterative values as the output. The ranging code signal may refer to a secondary modulating signal, a pseudo random noise code or a pseudo noise (PN) code, for example.

In one embodiment, the code correlator 14 correlates the digital received composite signal to the locally generated reference signal (e.g., a spread modulated signal) to decode at least a first portion of the received composite signal, while leaving a second portion of the received composite signal undecoded. The first portion of the received composite signal may comprise a first binary offset carrier signal component (e.g., BOC(1,1) or a dominant signal component characterized by a greater level of its spectral density compared to other signal components of the composite signal), whereas the second portion of the received composite signal may comprise a second binary offset carrier signal component (e.g., BOC (6,1) or a non-dominant signal component characterized by a lower level of its spectral density compared to other signal components of the composite signal). In one example, the code correlator 14 does not demodulate the nondominant or second binary offset carrier signal component (or second portion of the received composite signal) where the first binary offset carrier signal component (or first portion of the received composite signal) comprises the locally generated reference signal that is inputted into the code correlator 14. Accordingly, because the second binary offset carrier signal component or the second portion of the received composite signal is not fully demodulated, the receiver operates with some minimal or tolerable degradation (e.g., approximately 0.8 decibel (dB) degradation for certain configurations) in the signal-to-noise ratio of the received composite signal.

Figure 2:
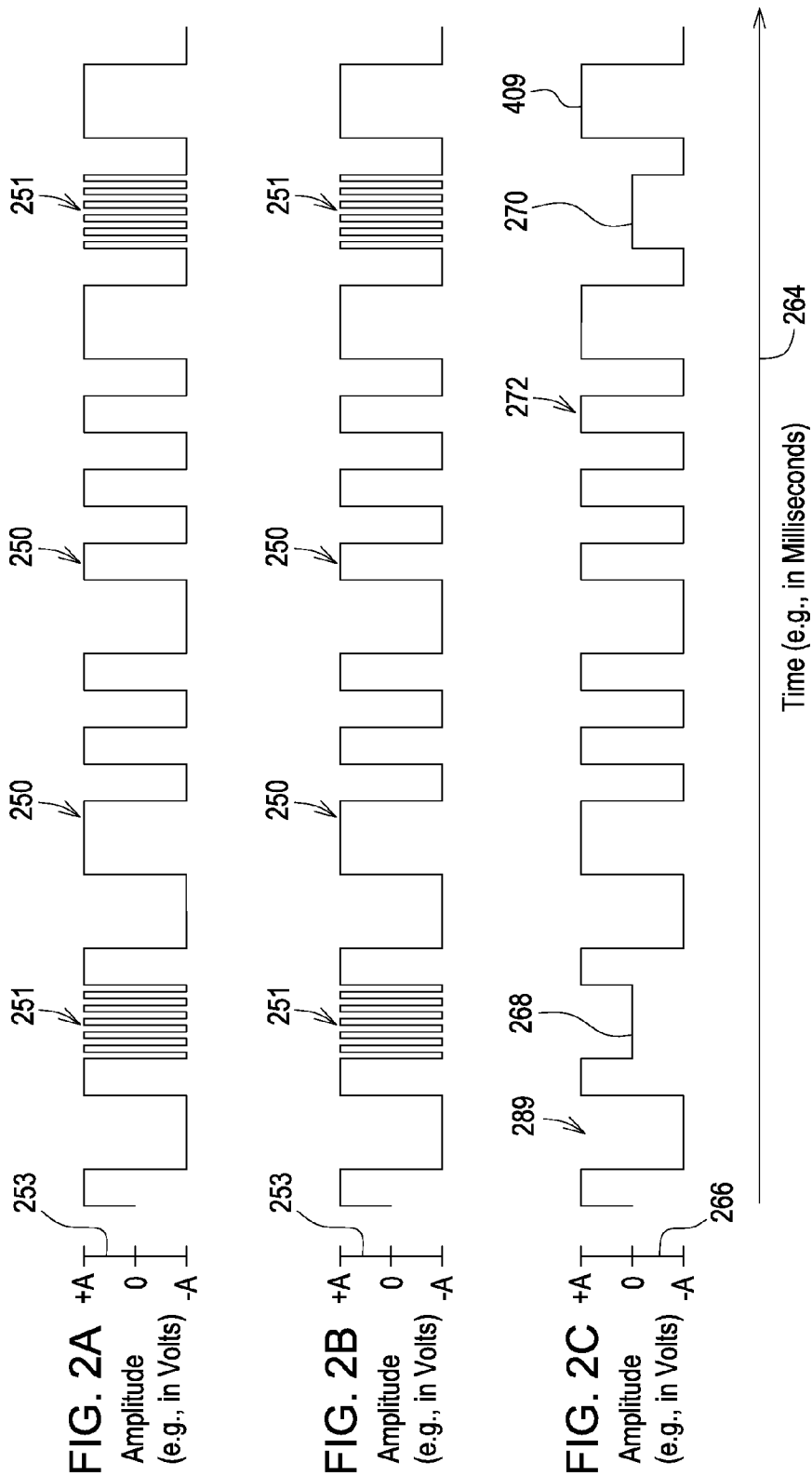
FIG. 2A is a diagram of an illustrative baseband representation of the received composite signal.
FIG. 2B is a diagram of an illustrative baseband representation of the locally generated reference signal in the second mode.
FIG. 2C is a diagram of an illustrative baseband representation of the locally generated reference signal in the first mode.

FIG. 2A illustrates one possible representation of the digital baseband composite signal, or its equivalent that modulates the digital intermediate frequency composite signal for the first mode, the second mode or both. For example, the composite signal of FIG. 2A may comprise a TMBOC or BOC signal that is outputted by the analog-to digital converter at node 2A in FIG. 1, inputted at the code correlator 14 at node 2A in FIG. 1, or both.

The vertical axis 253 of FIG. 2A shows an amplitude of the signal (e.g., in Volts), whereas the common horizontal axis 264 of FIG. 2A, FIG. 2B and FIG. 2C show elapsed time (e.g., in milliseconds). As illustrated the composite signal may comprise a Manchester coded, square wave signal that varies between an amplitude of +A and −A.

In one configuration, the composite signal of FIG. 2A may be formed by a satellite transmitter that multiplexes a first binary offset carrier signal component (BOC (n,m) signal) and a second binary offset carrier signal component (BOC(o, p) signal), where n, m, o and p are integer values, m is $f_m/f_c$, n is $f_n/f_c$, $f_m$ is a first subcarrier frequency, $f_n$ is the actual chip frequency, and $f_c$ is the reference chip frequency, o is $f_o/f_c$, p is $f_p/f_c$, fo is a second subcarrier frequency, $f_p$ is the actual chip frequency and $f_c$ is the reference chip frequency, where the second binary offset carrier signal component has a higher frequency component than the first binary offset carrier signal component. The first binary offset carrier signal component (e.g., BOC(n,m)) is illustrated at reference numbers 250, whereas the second binary offset carrier signal component (e.g., BOC(o,p)) is illustrated at reference numbers 251.

FIG. 2B illustrates one possible representation of the locally generated reference signal for the second mode, or when the mode controller 34 is programmed to operate in the second mode or controls the receiver 211 (e.g., multiplexer 29) to operate in the second mode. In FIG. 2B, the locally generated reference signal is at baseband or the same intermediate frequency as the output of the receiver front end 10. For example, the locally generated reference signal may comprise a signal that appears at the mixer output node 41 or at reference node 2B in FIG. 1. The vertical axis 253 of FIG. 2B shows an amplitude of the signal (e.g., in Volts), whereas the common horizontal axis 264 of FIG. 2A, FIG. 2B, and FIG. 2C show elapsed time (e.g., in milliseconds). Like reference numbers in FIG. 2A, FIG. 2B and FIG. 2C indicate like elements or features. For example, in FIG. 2B the first binary offset carrier signal component (e.g., BOC(n,m)) is illustrated at reference numbers 250, whereas the second binary offset carrier signal component (e.g., BOC(o,p)) is illustrated at reference numbers 251.

FIG. 2C illustrates one possible representation of the locally generated reference signal 289 for the first mode, or when the mode controller 34 is programmed to operate in the first mode or controls the receiver 211 (e.g., multiplexer 29) to operate in the first mode. In FIG. 2C, the locally generated reference signal is at baseband or the same intermediate frequency as the output of the receiver front end 10. For example, the locally generated reference signal 289 may comprise a signal that appears at the mixer output node 41 or at reference node 2C in FIG. 1. The vertical axis 266 of FIG. 2C shows an amplitude of the signal (e.g., in Volts), whereas the common horizontal axis 264 of FIG. 2A, FIG. 2B, FIG. 2C show elapsed time (e.g., in milliseconds).

As illustrated the locally generated reference signal 289 may comprise a generally Manchester coded, square wave signal that varies between an amplitude of +A and −A, except that the signal portions (268, 270) or time windows when the null code is inserted the locally generated reference signal 289 differs from a standard Manchester encoded signal. The standard Manchester encoded signal indicates a first logic level by a high-to-low transition and a second logic level by a low-to-high transition, where the signal has no direct current (DC) component, such as the null code logic level. In one embodiment, at the mixer output node 41 the locally generated reference signal has a direct current component at signal portions (268, 270) which does not agree with the received composite signal presented at the other input to the correlator 14. However, the receiver performance (e.g., signal-to-noise ratio of the receiver 211) is better than merely presenting the dominant component (e.g., BOC(1,1) signal component) of the composite signal during signal portions (268, 270).

In the first mode, the absence of the dominant signal component (e.g., BOC(1,1)) of the composite signal (e.g., for certain time slots in which the BOC (6,1) is active or expressed), and the dominant signal component's replacement by the null code for active time slots of the non-dominant signal component (e.g., BOC (6,1)) in accordance with the predetermined sequence may reduce the noise (signal noise) that would otherwise be associated with the dominant signal component. Advantageously, in the first mode the noise associated with direct current (e.g., approximately zero Hertz) is more readily removed and filtered than the noise associated with the first signal or the dominant signal component (e.g., BOC(1,1)). For example, the BOC (1,1) signal may be modulated at 1 MHz.

In one embodiment, in the first mode, the second mode, or both all or a substantial majority of the time slots are associated with the first signal or dominant signal component. The first binary offset carrier signal component (e.g., BOC(n,m)) is illustrated at reference numbers 260, whereas the second binary offset carrier signal component (e.g., BOC(o,p)) is not shown or substantially present in the locally generated reference signal of FIG. 2B.

Figure 3:
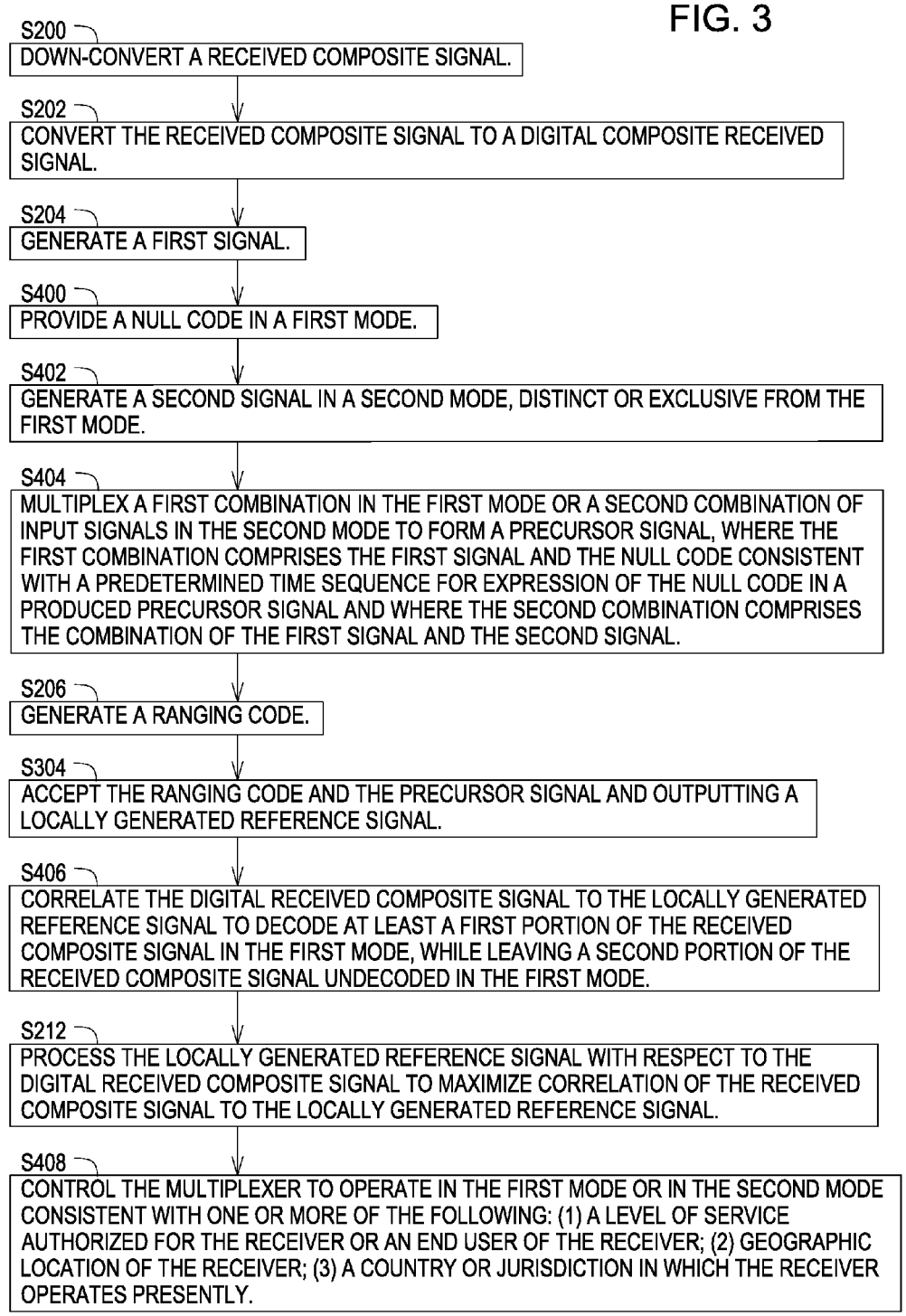
FIG. 3 is a flow chart of one embodiment of a method for receiving a composite signal (e.g., multiplexed binary offset carrier signal).

FIG. 3 illustrates a method for receiving a received composite signal (e.g., binary offset carrier signal or a multiplexed binary offset carrier signal). The method begins in step S200.

In step S200, a receiver 211 or receiver front-end 10 down-converts a received composite signal (e.g., multiplexed binary offset carrier signal or pilot component of an L1C signal for GPS). For example, the receiver down-converts a received composite signal to a baseband signal or to an intermediate frequency signal. In one embodiment, the received composite signal comprises a multiplexed binary offset carrier (MBOC) or a time multiplexed binary offset carrier (TMBOC) signal. Under a first example of the MBOC signal, the received composite signal comprises a multiplexed binary offset carrier (MBOC) signal, where a first portion (e.g., a dominant BOC component) of the received composite signal comprises a first binary offset carrier (BOC) (n,m) signal component, where a second portion (e.g., nondominant BOC component) of the received composite signal comprises a second binary offset carrier (BOC) (o,p) signal component, where n, m, o and p are integer values. A dominant BOC component is the BOC component that has the greatest spectral power density or the occupies the greatest number of time slots in the MBOC signal, for instance. Under a second example of the MBOC signal, the received composite signal comprises a multiplexed binary offset carrier (MBOC) signal composed of a binary offset carrier (BOC) (1,1) signal component, and a BOC (6,1) signal component.

In step S202, the receiver 211 or an analog-to-digital converter 12 converts the received composite signal to a digital received composite signal. For example, the analog-to-digital 12 converter outputs a digital received composite signal at the baseband or intermediate frequency that is suitable for subsequent processing by one or more data processors, or other components of the receiver 211.

In step S204, the receiver 211 or a first signal generator 18 generates a first signal. The first signal may comprise a first subcarrier or a first modulating signal. The first signal generator 18 may generate a first signal in accordance with various techniques, which may be applied alternately or cumulatively. Under a first technique, the first signal generator 18 comprises a first square wave generator for generating a first signal at a first frequency. Under a second technique, the first signal generator 18 comprises a sinusoidal wave generator for generating a Sin BOC (1,1) signal precursor or another predecessor signal component for formation of a Sin BOC signal. Under a third technique, the first signal comprises a first precursor signal to a binary offset carrier (BOC)(1,1) signal or another predecessor signal component for formation of a BOC signal. Under a fourth technique, the first signal comprises a first precursor signal to a first binary offset carrier (BOC) signal (m,n), where m and n are positive integer values. Under a fifth technique, if the received composite signal comprises a multiplexed binary offset carrier (MBOC) signal composed of a binary offset carrier (BOC) (1,1) signal component and a BOC (6,1) signal component, then the first signal comprises a signal precursor of a BOC (1,1) signal.

In step S400, the receiver 10 or data storage device 30 (e.g., latch) provides a null code in a first mode. In one configuration, the data storage device 30 comprises one or more of the following: a latch, a register, a flip-flop, electronic memory, or nonvolatile electronic memory. The null code or null code signal comprises a voltage at or approaching zero volts and wherein the first signal has a maximum positive amplitude and a maximum negative amplitude such that the maximum positive amplitude is associated with a first logic level and the maximum negative amplitude is associated with a second logic level that is the opposite of the first logic level. In the first mode, the received composite signal comprises a multiplexed binary offset carrier (MBOC) or a time multiplexed binary offset carrier (TMBOC) signal and the predetermined time sequence is based on the time slots that a particular binary offset carrier signal component of the MBOC signal is expressed in the MBOC signal.

In step S402, the receiver 211 or a second signal generator 28 generates a second signal. The second signal may comprise a second modulating signal or a second subcarrier. The second signal generator 28 may generate a second signal in accordance with various techniques, which may be applied alternately or cumulatively. Under a first technique, in a second mode the second signal generator 28 comprises a second square wave generator for generating a second signal at a second frequency that is greater than the first frequency. Under a second technique, the second signal generator 28 comprises a sinusoidal wave generator for generating a Sin BOC(6,1) signal precursor or another predecessor signal component for formation of a Sin BOC signal. Under a third technique, in one embodiment, the second signal comprises a second precursor signal to a binary offset carrier (BOC)(6,1)

signal or another predecessor signal component for formation of a BOC signal. Under a fourth technique, the second signal comprises a second precursor signal to a second binary offset carrier (BOC) signal (m,n), where m and n are positive integer values. Under a fifth technique, if the received composite signal comprises a multiplexed binary offset carrier (MBOC) signal composed of a binary offset carrier (BOC) (1,1) signal component and a BOC (6,1) signal component, then the second signal comprises a signal precursor of a BOC (6,1) signal.

In step S404, the receiver 211 or a multiplexer 20 multiplexes a first combination in a first mode or a second combination of input signals in a second mode to form a precursor signal, where the first combination comprises the first signal and the null code consistent with the timing data 41 or the predetermined time sequence for expression of the null code in a produced precursor signal and where the second combination comprising the combination of the first signal and the second signal. In the first mode, the precursor signal is referred to as a first precursor signal at a multiplexer output 76. Similarly, in the second mode, the precursor signal is referred to as a second precursor signal at a multiplexer output 76.

In step S206, the receiver 211 or a ranging code generator 32 generates a ranging code. For example, the ranging code may comprise a secondary modulating signal, a pseudo-random noise code, or a pseudo noise code at a chipping rate or chipping frequency. At the satellite transmitter that transmits the composite signal, the composite signal can be modulated with substantially the same ranging code, such that the receiver 211 can recover the pilot code modulation or any data (e.g., navigation code) modulated on the composite signal, or any carrier phase information that supports estimating a receiver position with respect to one or more satellites.

In step S304, the receiver 211 or a mixer 26 accepts the ranging code and the precursor signal and outputs a locally generated reference signal.

In step S406, the receiver 211 or a code correlator 14 correlates the digital received composite signal to the locally generated reference signal to decode at least a first portion (e.g., dominant BOC component) of the received composite signal in the first mode, while leaving a second portion (e.g., nondominant BOC component) of the received composite signal undecoded in the first mode. Step S304 may be executed in accordance with various examples that may be applied alternately or cumulatively. Under a first example, if the received composite signal comprises a multiplexed binary offset carrier (MBOC) signal composed of a binary offset carrier (BOC) (1,1) signal component and a BOC (6,1) signal component, in the first mode, the locally generated reference signal comprises a modified BOC (1,1) signal modified such that a minority fraction of the total time slots of the BOC (1,1) signal during a frame or sampling period (e.g. a sampling period of arbitrary duration) has null codes. Under a second example, the code correlator 14 correlates the digital composite signal to the locally generated signal to demodulate the received composite signal to yield a demodulated signal 224.

Under a third example, the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, o and p are integer values, and where, in a first mode the locally generated reference signal is associated with a modified BOC (n,m) signal component that is temporally dominant in a majority of the time slots of the MBOC signal, the modified BOC signal component having null codes inserted in certain time slots associated with the second BOC signal component.

Under a fourth example, the receiver 211 or code correlator 14 correlates the digital composite signal to the locally generated signal to identify edge transitions for tracking the carrier phase of the of the received composite signal. Under a fifth example, in the second mode or the first mode, the code correlator 14 correlates the digital composite signal to the locally generated signal to demodulate the received composite signal or a pilot codes encoded thereon (e.g., to assist in decoding of any data encoded thereof or detection of carrier phase information).

Under a sixth example, the receiver 211 or code correlator 14 correlates the digital composite signal to the locally generated signal to demodulate the received composite signal. In a seventh example, in the second mode or the first mode, the receiver 211 or the code correlator 14 correlates the digital composite signal to the locally generated signal to demodulate a pilot code of the received composite signal (e.g., prior to decoding any navigation data encoded on one or more related signals or the received composite signal). In an eighth example, in the second mode or the first mode, the receiver 211 or the code correlator 14 correlates the digital composite signal to the locally generated signal to demodulate any navigation data encoded in the received composite signal.

In step S212, a data processor, data processing system 215 or a tracking loop signal processor 16 processes the locally generated reference signal with respect to the digital received composite signal based on maximizing correlation of the received composite signal to the locally generated reference signal. Step S212 may be executed in accordance with various procedures that may be applied individually or cumulatively. Under a first procedure, the data processor or tracking loop signal processor 16 adjusts a time delay of the locally generated signal, or signals derived therefrom, with respect to the digital component of the received signal based on maximizing the correlation of the received composite signal to the locally generated reference signal. Under a second procedure, the tracking loop signal processor 16 instructs the time delay module 22, shift register or phase shifter to adjust (e.g., dynamically) an adjustable time delay of the locally generated reference signal with respect to the digital received composite signal via a time delay module 22 to maximize correlation of the received composite signal to the locally generated reference signal.

In step S408, the receiver 211, a data processor or controller 36 controls the multiplexer 20 to operate in the first mode or in the second mode consistent with one or more of the following: (1) a level of service authorized for the receiver 211 or an end user of the receiver, (2) geographic location of the receiver 211 or a country or jurisdiction in which the receiver 211 operates presently, (3) a time period of service authorized for the receiver 211. In the first mode, a controller controls the selection of input signals, as the first signal and the null code or null code signal, provided to multiplexer input terminals (74, 79, 81) of the multiplexer 20 based on reference to the timing data 41 or the predetermined time sequence to produce, at the multiplexer output terminal 76 for certain time slots, a modified precursor signal (e.g., a modified BOC (1,1) precursor signal) modified such that a minority fraction of the time slots of the first signal or the dominant BOC precursor signal (e.g., BOC (1,1)) has null codes in accordance with the timing data 41 or the predetermined sequence. In the second mode that is mutually exclusive to the first mode, a controller 36 controls the selection of input signals, as the first signal and the second signal, provided to multiplexer input terminals (74, 79, 81) of the multiplexer 20 based on reference to the predetermined time sequence to produce, at the multiplexer output terminal 76, a precursor signal of MBOC signal, with a dominant BOC precursor signal (e.g., BOC (1,1) precursor) for a majority of the time slots and a non-dominant (e.g., a BOC (6,1) signal) for a minority of the time slots of the MBOC signal.

Step 408 may be executed in accordance with various procedures that may be applied cumulatively and individually. Under a first procedure, the controller 36 is programmed to inhibit or deactivate the selection of the first mode or the second mode for a time period. Under a second procedure, the inhibition or deactivation is responsive to at least one of: (a) a received electromagnetic signal modulated with a security data message for reception by the receiver in a demodulated signal, where the received electromagnetic signal is received at an optional wireless device 97 (e.g., receiver or transceiver) coupled to data port 99, or (b) a security data message received via a local data port 99 of the receiver associated with the mode controller 34. In FIG. 1, the optional wireless device 97 is shown in dashed lines to indicate that it may not be present where a transmission line or cable is connected directly to the data port 99, for example.

Under a third procedure, the controller 36 is programmed to restrict or limit the receiver to operation in the first mode or the second mode for a time period. Under a fourth procedure, the inhibition or deactivation is responsive to at least one of: (a) a received electromagnetic signal modulated with a security data message for reception by the receiver in a demodulated signal, where the received electromagnetic signal is received at an optional wireless device 97 (e.g., transceiver) coupled to data port 99, or (b) a security data message received via a local data port 99 of the receiver associated with the controller.

In one embodiment, the receiver (e.g., 11) of a satellite navigation system, such as the Global Positioning System (GPS), may use an L1C signal that is modulated with a time multiplexed binary offset carrier TMBOC (6,1,4/33) Pilot component at an L1 carrier frequency (e.g., 1575.42 MHz). The composite signal may comprise the L1C signal. The L1C signal comprises two components, the Data component and the Pilot component. The Data component only contains a minority (e.g., approximately 25%) of the total power spectral density of the L1C signal while the Pilot component contains a majority (e.g., the remaining 75%) of the total power spectral density of the L1C signal.

The Data component is binary offset carrier BOC (1,1) signal modulated by a modulating signal that comprises CNAV data bits, where the modulating signal is multiplied by a data-component pseudo-noise (PN) code. Accordingly, the Data component is a BOC (1,1) signal modulated by message data (e.g., CNAV data bits) and a data-component PN code. CNAV data bits include information related to time, clock, status, ephemeris and almanac data related to one or more satellites of the navigation system. For example, an illustrative modulating signal can be formed by CNAV data bits that are modulo-2 added (or otherwise encoded) to an approximately 1 MHz (e.g., 1.023 MHz) square-wave signal or subcarrier, for example. The PN code of the Data component is a ranging code for formation of a binary offset carrier BOC(1, 1) signal at a subcarrier frequency of approximately 1 MHz (e.g., 1.023 MHz). The BOC(1,1) signal is derived from a general modulating signal multiplied by the ranging code or data-component PN code, where the general modulating signal is based on a Manchester encoded (e.g., sine Manchester encoded) square wave at approximately 1 MHz (e.g., 1.023) that is modulo-2 added to any message data (e.g., CNAV data bits). For example, the ranging code may be derived from a unique length sequence with a common expansion sequence of known length inserted at pseudo-random noise signal number dependent point, where the ranging code has a chipping rate (e.g., of approximately 1.023 MHz).

Figure 4:
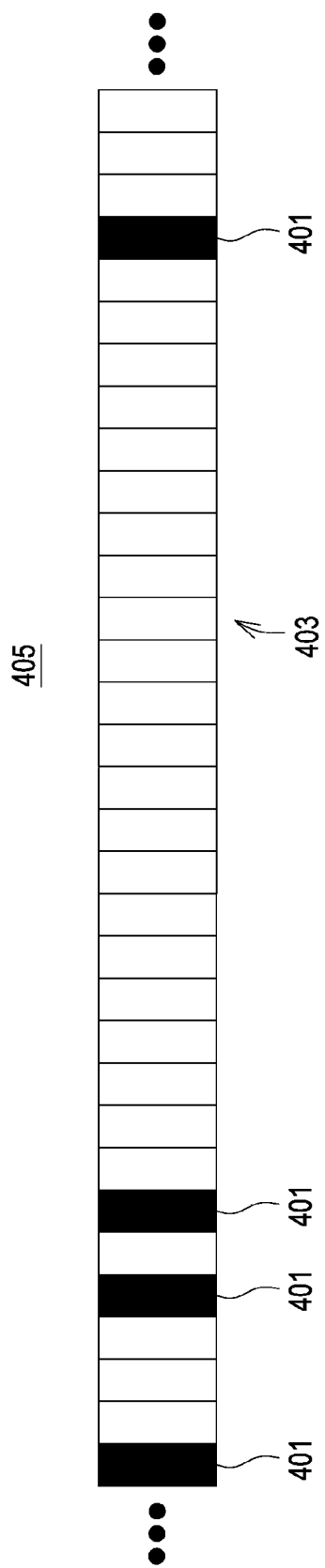
FIG. 4 provides an illustrative example of the modulation of the pilot component of a composite signal (e.g., L1C signal for a Global Positioning System).

The Pilot component is not modulated by any data bits, but is modulated by a different PN code than the data-component PN code (e.g., a pilot-component PN code that is generally orthogonal to data-component PN code used for the Data component to avoid interference). The PN code of the Pilot component is a ranging code modulated (e.g., alternately modulated) by the TMBOC(6,1,4/33) Manchester encoded square wave signal precursors at approximately 6 MHz (e.g., 6.138 MHz) and 1 MHz (e.g., 1.023 MHz). FIG. 4 provides the timing associated with the TMBOC signal in which 4 of 33 code chips are modulated by the 6.138 MHz BOC(6,1) Manchester-encoded square wave and the other 29 of 33 code chips are modulated by a 1.023 MHz BOC(1,1) Manchester-encoded square wave.

FIG. 4 illustrates the blocks of spread modulating signal 405 (e.g., time division multiplexed binary offset carrier signal) composed of a first signal and a null code signal in the first mode and composed of a first signal and a second signal in a second mode. For example, if the multiplexed binary offset carrier signal is a TMBOC (6, 1, 4/33) signal, in FIG. 4 the dark shaded blocks 401 may represent the locations that contain the BOC(6,1) signal and the empty or light blocks 403 may indicate the location of the BOC(1,1) signal. The ranging code may be derived from a unique length sequence with a common expansion sequence of known length inserted at pseudo-random noise signal number dependent point, where the ranging code has a chipping rate (e.g., of approximately 1.023 MHz).

For the locally generated reference signal, a complete replica of the TMBOC (e.g., TMBOC(6,1,4/33)) signal used to modulate the L1C Pilot component is required to demodulate the received signal without any degradation of the received signal-to-noise ratio of the received composite signal (e.g., L1C signal or the Pilot component of the L1C signal). If the receiver code used to demodulate the Pilot component excises the BOC(6,1) code chips, such a reference code would also demodulate the Pilot component faithfully but would only experience approximately some signal-to-noise ratio loss (e.g., 0.56 dB loss of SNR) for the Pilot component. To excise the BOC(6,1) code chips requires knowledge of the location of the BOC(6,1) code chips. The specification of the L1C signal and the location of the BOC(6,1) code chips of the L1C signal are specified in IS-GPS-800A, which is entitled "Global Positioning System Directorate Systems Engineering & Integration Interface Specification IS-GPS-800, Naystar GPS Space Segment/User Segment L1C Interface," publication IS-GPS-800B, dated 21 Sep. 2011, available on-line at http://www.gps.gov/technical/icwg/IS-GPS-800B.pdf which is hereby incorporated by reference.

In a first mode, the receiver and method described in this document is well suited for at least partially decoding the composite signal or the multiplexed binary offset signal with minimal or nominal loss of performance (e.g., signal-to-noise ratio) in comparison to certain prior art receivers that fully decode the composite signal or the multiplexed binary offset signal. For example, in the first mode the receiver and method described in this document is well suited for restricting the receiver, or its end user, from full access to a local replica of the composite signal for full demodulation of the composite signal, consistent with a target end user level or end user authorization desired by a service provider of satellite signals or a receiver manufacturer. Conversely, the second mode the receiver is well suited for providing full access for full demodulation of the local replica of the composite signal, consistent with a target end user level or end user authorization desired by a service provider of satellite signals or a receiver manufacturer. Such end user authorization may be based on the geographic location of the receiver or the end user, among other things. Such end user authorization may also be based on the respective fee or premium charged for service or a certain corresponding level of service, for instance.

Having described the preferred embodiment, it will become apparent that various modifications can be made without departing from the scope of the invention as defined in the accompanying claims. For example, one or more of any dependent claims set forth in this document may be combined with any independent claim to form any combination of features set forth in the appended claims, and such combination of features in the claims are hereby incorporated by reference into the specification of this document.

The invention claimed is:

1. A receiver for receiving a binary offset carrier signal, the receiver comprising:
    a receiver front-end for down-converting a received composite signal;
    an analog-to-digital converter for converting the received composite signal to a digital received composite signal;
    a first signal generator for generating a first signal;
    a second signal generator for generating a second signal;
    a data storage device for providing a null code;
    a multiplexer for multiplexing a first combination in a first mode or a second combination of input signals in a second mode to form a precursor signal, the first combination comprising the first signal and the null code consistent with a predetermined time sequence for expression of the null code in the precursor signal, the second combination comprising the combination of the first signal and the second signal;
    a ranging code generator for generating a ranging code;
    a mixer accepting the ranging code and the precursor signal and outputting a locally generated reference signal;
    a code correlator for correlating the digital received composite signal to the locally generated reference signal to decode at least a first portion of the received composite signal in the first mode;
    a tracking loop signal processor for processing the locally generated reference signal with respect to the digital received composite signal to maximize correlation of the received composite signal to the locally generated reference signal; and
    a controller for controlling the multiplexor to operate in the first mode or in the second mode consistent with a level of service, geographic region, or time period authorized for the receiver or an end user of the receiver.

2. The receiver according to claim 1 wherein in the first mode, the code correlator is adapted to correlate the digital received composite signal to the locally generated reference signal to decode at least a first portion of the received composite signal, while leaving a second portion of the received composite signal undecoded.

3. The receiver according to claim 1 wherein in a second mode, the code correlator can correlate the digital received composite signal to the locally generated reference signal to decode completely the entire received composite signal.

4. The receiver according to claim 1 wherein, in the first mode, the received composite signal comprises a multiplexed binary offset carrier (MBOC) or a time multiplexed binary offset carrier (TMBOC) signal and wherein the predetermined time sequence is based on the time slots that a particular binary offset carrier signal component of the MBOC signal is expressed in the MBOC signal.

5. The receiver according to claim 1 wherein, in the first mode, the received composite signal comprises a multiplexed binary offset carrier (MBOC) or a time multiplexed binary offset carrier (TMBOC) signal and wherein the predetermined time sequence is based on the time slots that a MBOC (6,1) signal is expressed in the MBOC signal.

6. The receiver according to claim 1 further comprising:
    in the first mode, a controller for controlling the selection of time slots provided to multiplexer input terminals of the multiplexer based on reference to the predetermined time sequence to produce, at the multiplexer output terminal, the precursor signal of a modified BOC (1,1) modified such that a minority fraction of the precursor of the BOC (1,1) has null codes.

7. The receiver according to claim 1 wherein the data storage device comprises one or more of the following: a latch, a register, a flip-flop, electronic memory, or nonvolatile electronic memory.

8. The receiver according to claim 1 wherein the null code comprises a voltage at or approaching zero volts and wherein the first signal has a maximum positive amplitude and a maximum negative amplitude such that the maximum positive amplitude is associated with a first logic level and the maximum negative amplitude is associated with a second logic level that is the opposite of the first logic level.

9. The receiver according to claim 1 wherein the received composite signal comprises a multiplexed binary offset carrier (MBOC) signal composed of a binary offset carrier (BOC) (1,1) signal component, and a BOC (6,1) signal component, and wherein the first signal comprises a primary signal precursor of a BOC (1,1) signal and wherein the second signal comprises a secondary signal precursor of a BOC (6,1) signal.

10. The receiver according to claim 1 wherein the received composite signal comprises a multiplexed binary offset carrier (MBOC) signal composed of a binary offset carrier (BOC) (1,1) signal component, and a BOC (6,1) signal component, and wherein, in the first mode, the locally generated reference signal comprises a modified BOC (1,1) modified such that a minority fraction of the precursor of the BOC (1,1) has null codes.

11. The receiver according to claim 1 wherein the first signal generator comprises a first square wave generator for generating a first signal at a first frequency and wherein the second signal generator comprises a second square wave generator for generating a second signal at a second frequency that is greater than the first frequency.

12. The receiver according to claim 1 wherein the first signal generator comprises a sinusoidal wave generator for generating a SinBOC (1,1) signal precursor and wherein the second signal generator comprises a sinusoidal wave generator for generating a SinBOC(6,1) signal precursor.

13. The receiver according to claim 1 wherein the code correlator correlates the digital composite signal to the locally generated signal to demodulate the received composite signal.

14. The receiver according to claim 1 wherein the code correlator correlates the digital composite signal to the locally generated signal to identify edge transitions for tracking the carrier phase of the of the received composite signal.

15. The receiver according to claim 1 wherein, in the second mode or the first mode, the code correlator correlates the digital composite signal to the locally generated signal to demodulate a pilot code of the received composite signal.

16. The receiver according to claim 1 wherein, in the second mode or the first mode, the code correlator correlates the digital composite signal to the locally generated signal to demodulate any navigation data encoded in the received composite signal.

17. The receiver according to claim 1 wherein the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, o and p are integer values, and where, in a first mode the locally generated reference signal is associated with a modified BOC (n,m) signal component that is temporally dominant in a majority of the time slots of the MBOC signal, the modified BOC signal component having null codes inserted in certain time slots associated with the second BOC signal component.

18. The receiver according to claim 1 further comprising:
a data port coupled to the mode controller for programming the controller to restrict or limit the receiver to operation in the first mode for a time period.

19. A method for receiving a binary offset carrier signal, the method comprising:
down-converting a received composite signal;
converting the received composite signal to a digital received composite signal;
generating a first signal and a second signal;
providing a null code;
in a first mode comprising a first precursor signal, multiplexing the first signal and the null code consistent with a predetermined time sequence for expression of the null code in the first precursor signal;
in a second mode comprising a second percursor signal, where the second mode is mutually exclusive to the first mode, multiplexing the first signal and the second signal to produce the second precursor signal;
generating a ranging code;
accepting the ranging code and the precursor signal and outputting a locally generated reference signal, the precursor signal comprising the first precursor signal or the second precursor signal;
correlating the digital received composite signal to the locally generated reference signal to decode at least a first portion of the received composite signal; and
processing the locally generated reference signal with respect to the digital received composite signal to maximize correlation of the received composite signal to the locally generated reference signal.

20. The method according to claim 19 wherein the correlating comprises, in the first mode, correlating the digital received composite signal to the locally generated reference signal to decode at least a first portion of the received composite signal, while leaving a second portion of the received composite signal undecoded.

21. The method according to claim 19 wherein the correlating comprises, in the second mode, correlating the digital received composite signal to the locally generated reference signal to decode completely the received composite signal including the at least first portion.

22. The method according to claim 19 wherein the received composite signal comprises a multiplexed binary offset carrier (MBOC) or a time multiplexed binary offset carrier (TM-BOC) signal and wherein the predetermined time sequence is based on the time slots that a particular binary offset carrier signal component of the MBOC signal is expressed in the MBOC signal.

23. The method according to claim 19 wherein the received composite signal comprises a multiplexed binary offset carrier (MBOC) or a time multiplexed binary offset carrier (TM-BOC) signal and wherein the predetermined time sequence is based on the time slots that a BOC (6,1) signal is expressed in the MBOC signal.

24. The method according to claim 19 further comprising:
in the first mode, controlling the selection of time slots provided to multiplexer input terminals of a multiplexer based on reference to the predetermined time sequence to produce, at the multiplexer output terminal, the first precursor signal of a modified BOC (1,1) modified such that a minority fraction of the first precursor of the BOC (1,1) has null codes.

25. The method according to claim 19 wherein the providing of a null code comprises providing a null code by a data storage device.

26. The method according to claim 19 wherein the null code comprises a voltage at or approaching zero volts and wherein the first signal has a maximum positive amplitude and a maximum negative amplitude such that the maximum positive amplitude is associated with a first logic level and the maximum negative amplitude is associated with a second logic level that is the opposite of the first logic level.

27. The method according to claim 19 wherein the received composite signal comprises a multiplexed binary offset carrier (MBOC) signal composed of a binary offset carrier (BOC) (1,1) signal component and a BOC (6,1) signal component, and wherein the first signal comprises a signal precursor or predecessor for formation of a BOC (1,1) signal.

28. The method according to claim 19 wherein the received composite signal comprises a multiplexed binary offset carrier (MBOC) signal composed of a binary offset carrier (BOC) (1,1) signal component, and a BOC (6,1) signal component, and wherein the locally generated reference signal comprises a modified BOC (1,1) modified such that a minority fraction of a precursor or predecessor for formation of the BOC (1,1) has null codes.

29. The method according to claim 19 wherein the generating of the first signal comprises generating a first signal by a first square wave generator for generating a first signal at a first frequency.

30. The method according to claim 19 wherein the first signal comprises a sinusoidal waveform such as a SinBOC (1,1) signal precursor or predecessor for formation of the of the SinBOC(1,1) signal.

31. The method according to claim 19 wherein the correlating comprises correlating the digital composite signal to the locally generated signal to demodulate a pilot code or navigation data encoded in the received composite signal.

32. The method according to claim 19 wherein the correlating comprises correlating the digital composite signal to the locally generated signal to identify edge transitions for tracking the carrier phase of the of the received composite signal.

33. The method according to claim 19 wherein the received composite signal comprises a multiplexed binary offset carrier (MBOC) signal, where a first portion of the received composite signal comprises a first binary offset carrier (BOC) (n,m) signal component, where a second portion of the received composite signal comprises a second binary offset carrier (BOC) (o,p) signal component, where n, m, o and p are integer values, and where the locally generated reference signal is associated with a modified BOC (n,m) signal component that is temporally dominant in a majority of the time slots of the MBOC signal, the modified BOC signal component having null codes inserted in certain time slots associated with the second BOC signal component.

34. The method according to claim 19 further comprising: programming the controller to restrict or limit the receiver to operation in the first mode for a time period.

* * * * *